UNITED STATES PATENT OFFICE.

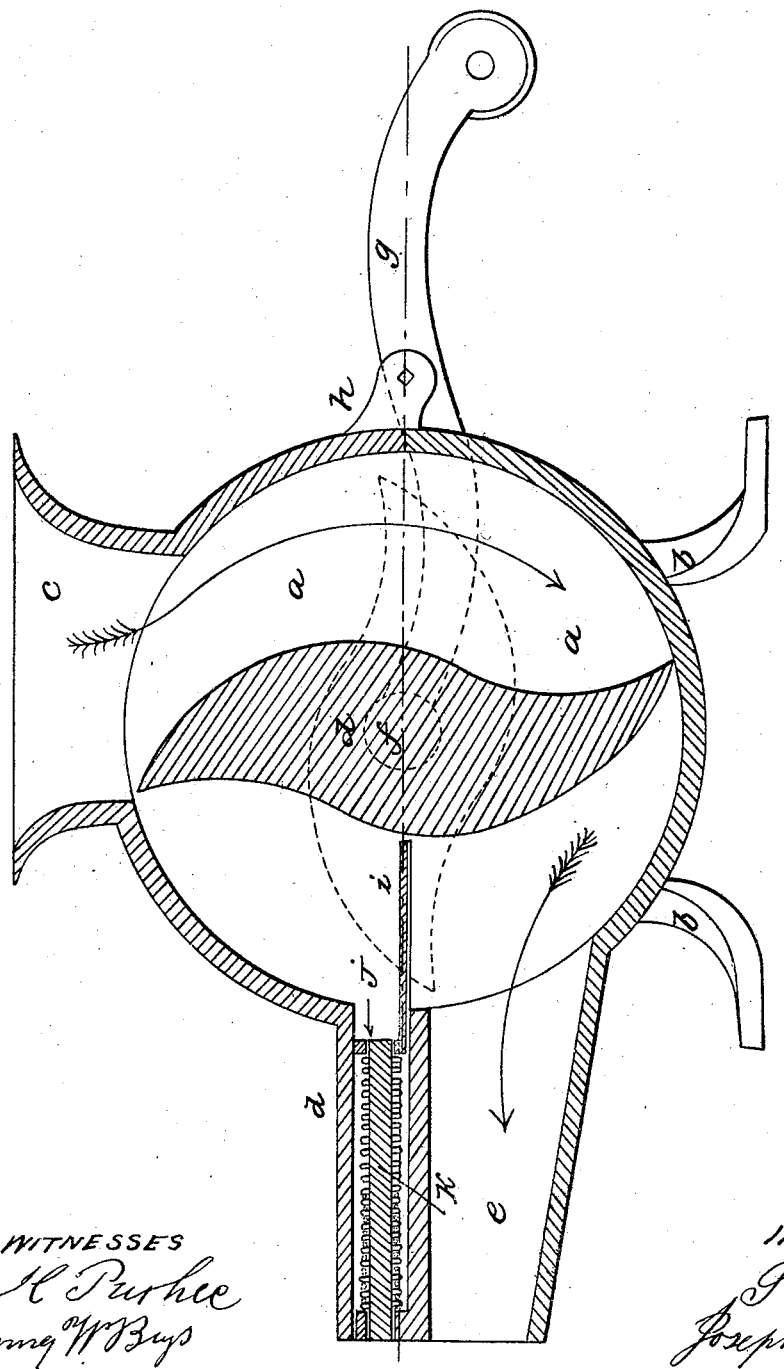

S. R. ATKINS AND J. R. HITCHCOCK, OF PLANTSVILLE, CONNECTICUT, ASSIGNORS TO SAID J. R. HITCHCOCK.

SAUSAGE-FILLER.

Specification of Letters Patent No. 27,196, dated February 21, 1860.

*To all whom it may concern:*

Be it known that we, SOLON R. ATKINS and JOSEPH H. HITCHCOCK, both of Plantsville, county of Hartford, and State of Connecticut, have invented certain new and useful Improvements in Sausage-Fillers; and we do hereby declare that the same is described and represented in the following specification and drawings; and to enable others skilled in the art to make and use our improvements we will proceed to describe their construction and operation, referring to the drawings, in which the same letters indicate like parts in each of the figures.

The nature of this improvement in sausage filler consists in making a cylindrical case in two halves connected together by proper joints, supported by proper legs, and having a hopper formed on the upper half through which the meat is fed into the machine, and a nozzle through which the meat is forced from the machine. Also, having journal boxes formed in the center of the cylinder to receive the journals of a properly shaped presser, the ends and outer edge of which being made so as to fit as closely as may be the inner surface of the said two part cylindrical case. Also having a spring slide cut-off arranged over the nozzle and nearly in line with the center of the cylinder so that as the meat is fed into the machine through the hopper the presser carries it around, and presses it into the nozzle and the spring cut-off working against the face of the presser, cuts off the meat from traveling in a continuous and circuitous direction with the presser, hence, as a necessary consequence it is forced by the action of the presser through the nozzle as desired.

In the accompanying drawings is shown a sectional view of our improvement.

*a, a,* are the two parts, or halves, of the cylinder or case secured together by means of properly formed hinges *h*, so as to allow the machine to be readily opened and closed.

*i* is a cut-off plate arranged between, or in grooves, in the upper and lower side plates of the case, and nozzle *a, e* and having a flange *j*, through which is an opening to receive the end of the spindle *k*, the opposite end of which is secured in the end of the nozzle, and upon which is placed a spring *l* taking its bearing and expending its force against the flange *j*, and the outer end of the nozzle, thereby keeping the cut-off closely up to the face of the presser *d*.

*b*, are the legs upon which it stands or by which it is fastened to any desirable place for use.

*c* is the hopper through which the meat is introduced into the machine.

*d*, is the presser, which may be made in the shape as shown in the drawings, or in any other desirable shape so that it will take the meat and carry it around and force it into and through the nozzle *e*, formed on the upper line, of the lower half of the case *a*, Said presser *d*, is secured in boxes formed one half in the upper, and one half in the lower part of the case *a*, by means of its journals *f*. One of the said journals protrudes far enough to receive a crank *g*, by which the machine is operated.

Now it will be clearly seen that when the meat is properly prepared and the cases rightly adjusted to the nozzle in the usual way, by simply feeding the meat into the hopper and revolving the presser by turning the crank, the meat will be taken around and forced into and through the nozzle into the cases, with greater ease and rapidity, than by those heretofore in use. It also being cheaper and more simple in its construction, renders it more desirable for use, thereby showing its decided advantage over others now in use.

We believe we have thus so described our improvement as to enable a mechanic skilled to make and use the same and also its nature and advantage over others now in use.

What we claim, therefore, and desire to secure by Letters Patent is—

A revolving presser *d*, within the case *a*, with the cut-off *i*, in the manner as and for the purpose substantially as described.

In testimony whereof we have hereunto set our hands and affixed our seals this third day of February, 1860.

SOLON R. ATKINS. [L. S.]
JOSEPH R. HITCHCOCK. [L. S.]

Witnesses:
I. C. PARKER,
JEREMY W. BLISS.